United States Patent [19]

Pold et al.

[11] Patent Number: 5,116,160

[45] Date of Patent: May 26, 1992

[54] CONNECTORS

[76] Inventors: Juri Pold; Ilmar Pold, both of 1/25 Brougham Pl, Alberton, Australia

[21] Appl. No.: 521,097

[22] Filed: May 9, 1990

[30] Foreign Application Priority Data

May 9, 1989 [AU] Australia ................... PJ4091

[51] Int. Cl.⁵ ............................................. F16B 7/00
[52] U.S. Cl. ................................. 403/172; 403/190; 403/217
[58] Field of Search ........ 403/170, 171, 176, 190–192, 403/201, 245, 252, 256, 258, 260, 264, 217, 172

[56] References Cited

U.S. PATENT DOCUMENTS

| 3,563,580 | 2/1971 | Black | 403/172 |
| 4,065,220 | 12/1977 | Ruga | 403/176 X |
| 4,099,888 | 7/1978 | Simone | 403/172 |
| 4,145,149 | 3/1979 | Ruga | 403/217 |
| 4,187,034 | 2/1980 | Dziewolski | 403/217 |
| 4,622,795 | 11/1986 | Codd | 403/172 X |
| 4,624,090 | 11/1986 | Stienen | 403/172 X |
| 4,718,789 | 1/1988 | Kuenen | 403/264 X |
| 4,867,596 | 9/1989 | Ocuim | 403/170 |
| 4,921,370 | 5/1990 | Handler et al. | 403/191 X |
| 4,923,322 | 5/1990 | Burg | 403/190 X |

FOREIGN PATENT DOCUMENTS 421687 12/1934 United Kingdom ............... 403/191

Primary Examiner—Peter M. Cuomo
Attorney, Agent, or Firm—Oldham, Oldham & Wilson Co.

[57] ABSTRACT

A connector including a rectangular block for attachment to the side of a first frame member, with wings preferably fit into slots within the block and extending laterally from the block, edges of the wings provided an interference fit within hollow frame members to connect the hollow frame members to the first frame member. The wings preferably have cross pieces slotted over their ends so that four edges provide the interference fit.

14 Claims, 6 Drawing Sheets

CONNECTORS

TECHNICAL FIELD

This invention relates to connectors particularly of a type suitable for joining frame elements such as tubular metal pipes useful for furniture.

BACKGROUND OF THE INVENTION

It is common to join metallic frame members by welding these together but this creates the problem firstly that the weld must be very adequately cleaned up afterwards and it is also very time consuming.

Various press on connectors have been proposed and in fact used hitherto including plastic fittings which are insertable within the end of the pipe but these suffer from providing an excessive resiliency to the connected members or, where they are on show, the appearance is not always preferable.

SUMMARY OF THE INVENTION

It is an object of this invention to propose a different technique for providing for connectors for such applications.

The invention could thus be said to reside in a connector for providing for interconnection between frame members said connector including. a block adapted to be attached to a side of a first frame member, and a wing extending from the said block. a first end portion of said wing adapted to locate within the end of a hollow frame member to thereby connect said first frame member to said hollow frame member In preference. the block has secured thereto at least two wings extending with an inclined angle. one with respect to the other and adapted to fit with an interference fit within the end of a hollow frame member.

The invention in an alternate form can be said to reside in the combination of a first frame member to which there is attached a block. and there is a second frame member which is hollow and of consistent cross-sectional shape along its length and which engages with interference fit, a wing extending from the block.

In preference. each wing is comprised of one end of a wing part which interconnects with the block by being affixed at an apex thereof within a slot within the block.

In preference. the block is comprised of a rectangular member of elongate proportions having an aperture passing therethrough for securing the block to an outside of the first frame member, said aperture passing across the slot, said slot extending from an end of the rectangular shape and receiving an apex of the wing part such that the wing part is adapted to be affixed within the block and to the said first frame member by fixing means passing through the respective aperture.

In preference, each wing is adapted to locate within the end of the hollow part of a frame member with an interference fit and there are adapted means whereby to positively secure this thereto such as mutually aligned apertures and a rivet passing mutually therebetween.

One of the problems with providing a wing which fits with interference fit into the circular aperture of a metal conduit is that if there is any displacement force perhaps between the conduit and the wing, the circular shape of the conduit can be reasonably easily distorted.

This inherently means that any grip existing between the two parts can be more readily loosened than might be desirable and it is to this problem that this further feature is directed.

In accord with this further feature, at the first end portion of each wing there is provided a cross piece perpendicular to each wing so that there are provided at the first end portion of each wing four spaced apart edges adapted to be located within the hollow frame member.

It is inherent of course that the shape and size of the respective parts at the end of the wing should be so positioned and at such a shape and size that these will engage collectively with interference fit within the shape of the hollow conduit.

One of the advantage of such an arrangement is that this will reduce significantly the extent to which freedom of movement of a hollow frame member thus affixed can be achieved by a bending action on he wall of the frame member.

If the free part of a wall is a semi-circular part, it is readily understood that this can be more easily straightened out and therefore give some deflectivity as compared to that amount of freedom of a quarter circle of the wall.

In preference, the further part of the wing is secured thereon by being slotted thereover.

The invention will be better understood when referred to and described with the assistance of drawings.

DETAILED DESCRIPTION OF THE PREFERRED EMBODIMENT

Figure 1:
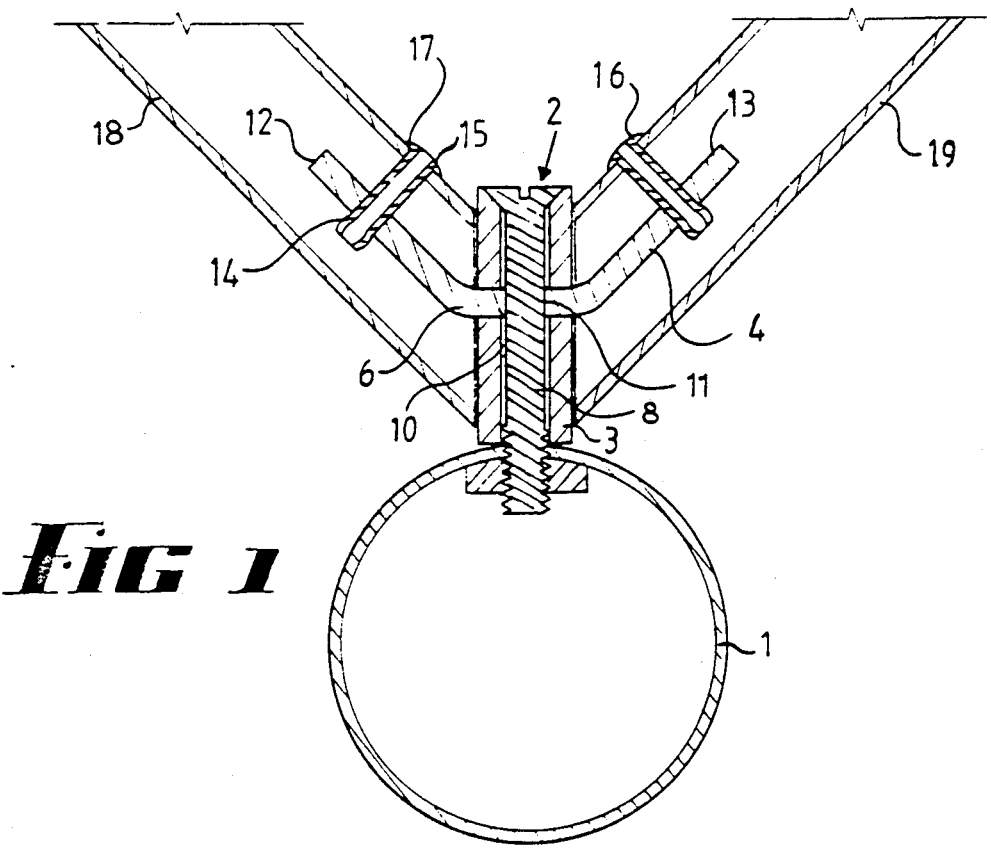
FIG. 1 is a cross-sectional view of an assembly using the concept of this invention applicable to a first embodiment.

Referring in detail to the drawings, there is shown a first frame member 1 which is a hollow metal tube which is appropriate for instance for the leg of a table or a chair.

Affixed thereto is the connector assembly 2 which includes a block 3 and wing parts 4 and 5. Each of the wing parts 4 and 5 is comprised of a member comprised of metal and generally in the form of an angle bracket shape with an apex at 6 which is of planar shape such that it will fit with a reasonably close interference fit into a slot 7 of the block 3.

The block 3 is secured to the frame member 1 by means of bolts 8 which pass mutually through apertures 9 and 10 in the block and through aperture 11 in the wing part thereby securing this within the slot 7.

Each of the wing parts 4 and 5 have wings which are shown typically at 12 and 13 and each of these have an aperture shown typically at 14 through which rivets such as is shown at 15 and 16 mutually engage with respect to a coincident aperture 17, in the attached hollow frame member. The attached hollow frame member comprises a hollow tube at 18 in the one instance 19, 20 and 21 in the first embodiment.

By having each of the hollow frame members which are tubes of constant cross-sectional shape along their length and which are appropriately shaped at their end such as 21 so as to provide a flush engagement against the side of the block 3, provides firstly a very secure fitting and also one which provides an appearance of elegance.

One feature that is not immediately apparent from the drawings is that the width of each of the wings such as at 4 and 5 is such that these fit with reasonably close coincidence to the internal diameter of the respective tubes 18, 19, 20 and 21 so that in fact the planar shape will essentially lock itself midway within the tube.

This has the effect of providing an additional strengthening of the join formed thereby but it also has the additional advantage of providing a jamming effect when the rivet 15 or 16 pulls the wing closer to one side with the edges of the wings jamming against the inside of a respective tube.

This takes up some of the natural resiliency of the metal parts and holds these against subsequent relaxation of any of the metal so that the connector will stay strongly and rigidly supportive for a long period of time even with the simplest of such illustrated connections.

Figure 2:
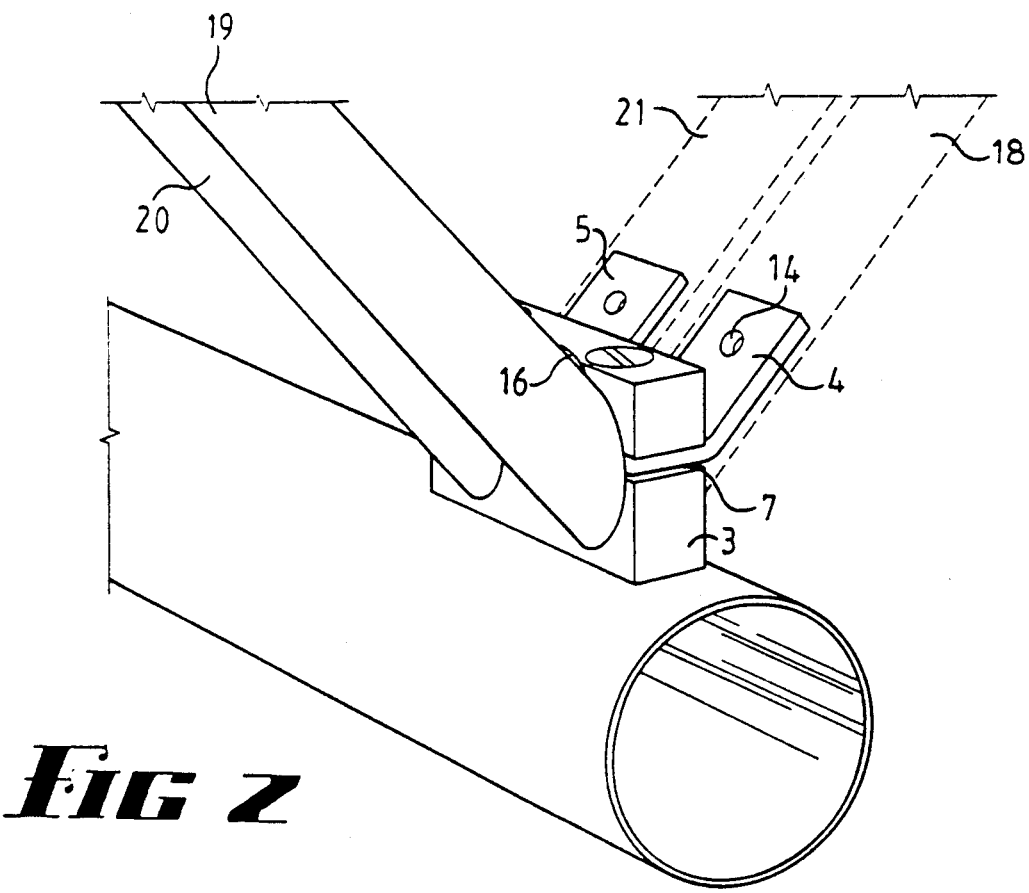
FIG. 2 is a perspective view of the assembly of the first embodiment as shown in FIG. 1.
Figure 3:
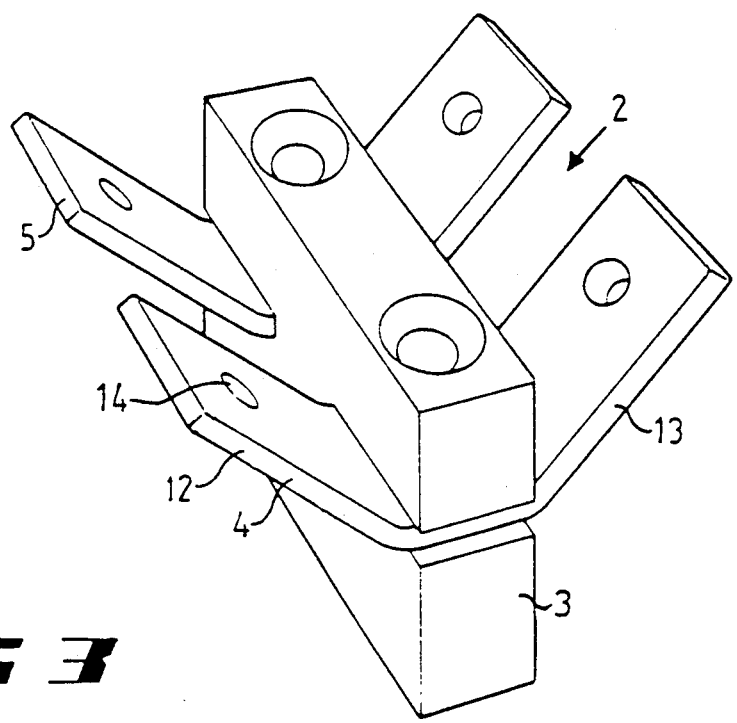
FIG. 3 is a top perspective view of the block and wing parts in an assembled relationship as included in the first embodiment as shown in FIGS. 1 and 2.
Figure 4:
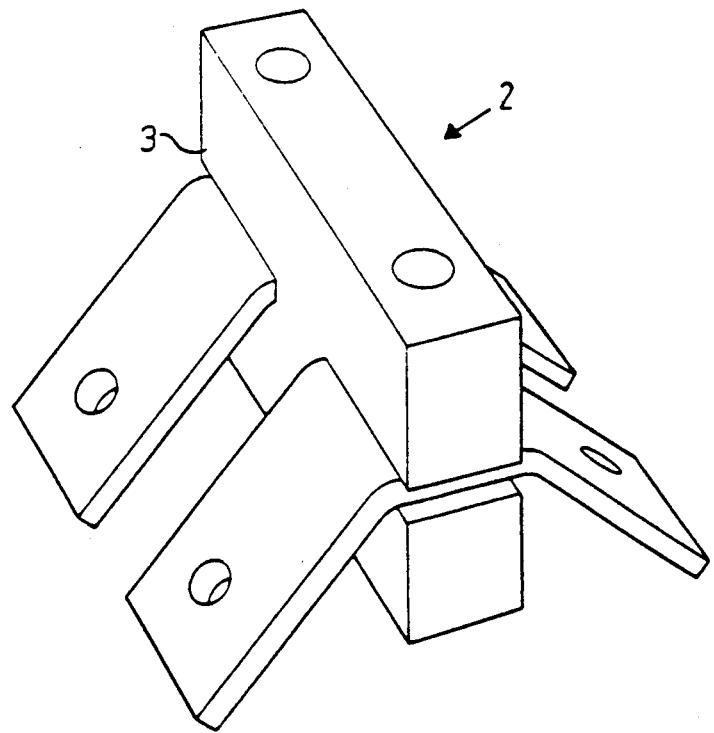
FIG. 4 is an underneath perspective view of the same assembly as in FIG. 3.
Figure 5:
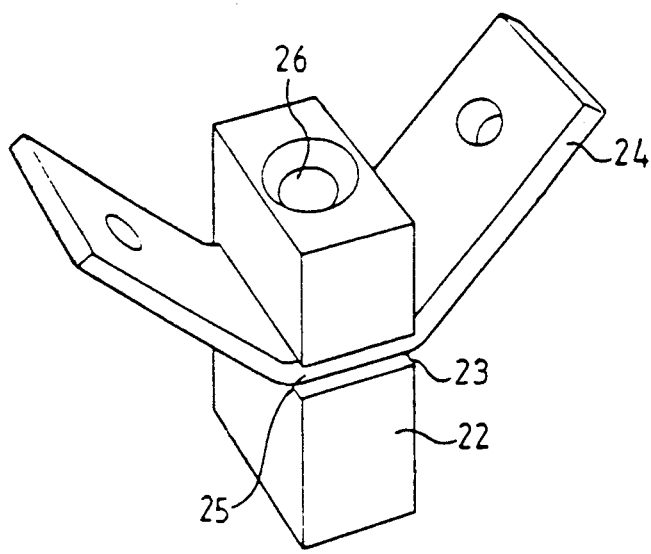
FIG. 5 is a perspective view of an assembly according to a second embodiment.
Figure 6:
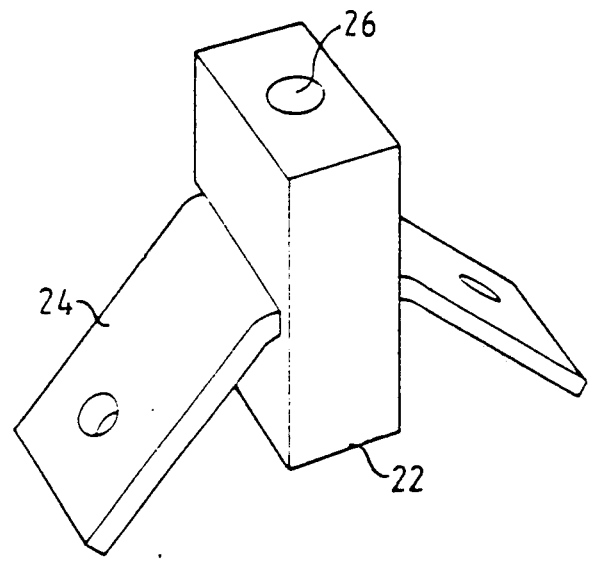
FIG. 6 is a further view, namely the bottom perspective view of the same assembly as shown in FIG. 5.
Figure 7:
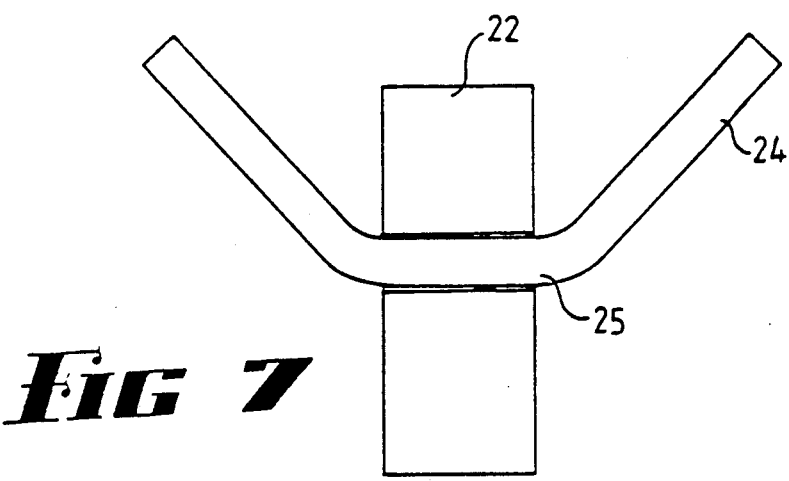
FIG. 7 is the same element in side elevation as is shown in FIGS. 5 and 6.

While the embodiment as shown in FIGS. 1 and 2 with the assembly as shown in FIG. 3 and 4 is one illustration of the invention, the block in a further form can comprise a plate with a slot or it can comprise one wing part rather than two as illustrated in FIGS. 5, 6 and 7.

In this second embodiment then, the block 22 has a slot 23 through which a wing part 24 engages.

There is an aperture 26 which passes so as to coincide with an equivalent aperture in the apex 25 of the wing part 24 to enable the block 22 to be secured to an appropriate alternate frame member which is not shown.

Figure 8:
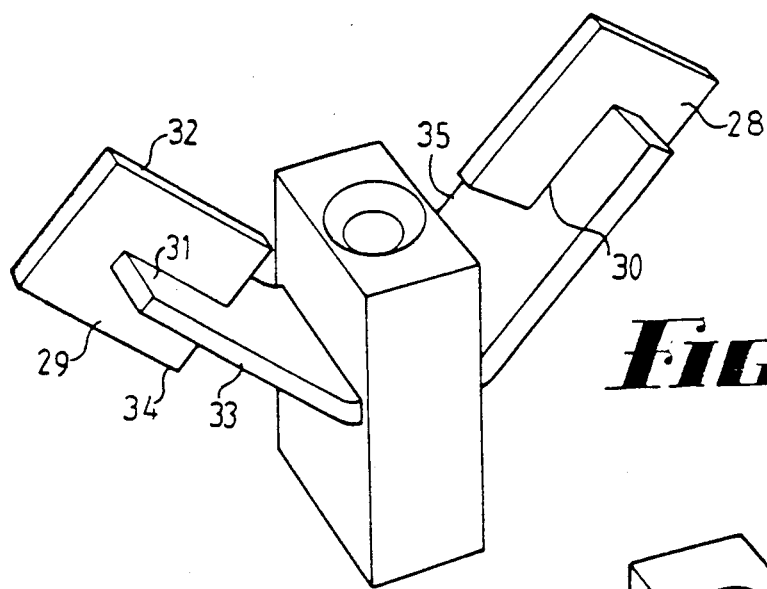
FIG. 8 is a perspective view of an assembly using the concept of this invention applicable to a third embodiment.
Figure 9:
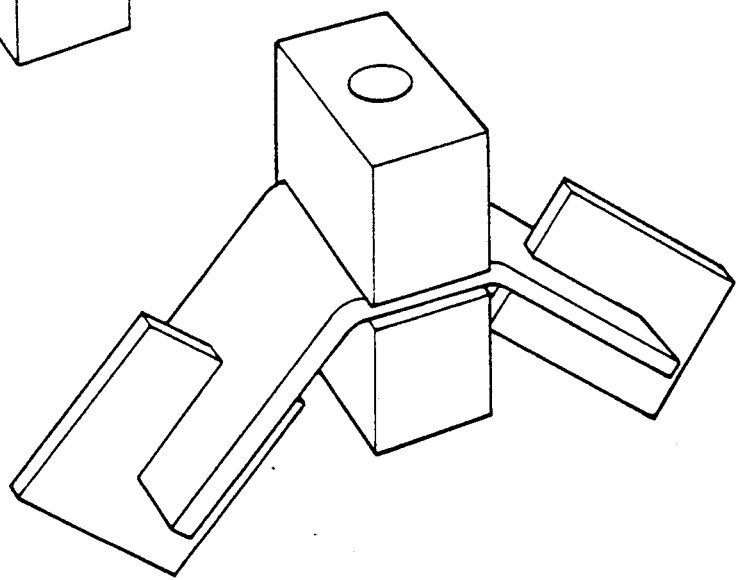
FIG. 9 is a perspective view of the underneath side of the device as shown in FIG. 8.
Figure 10:
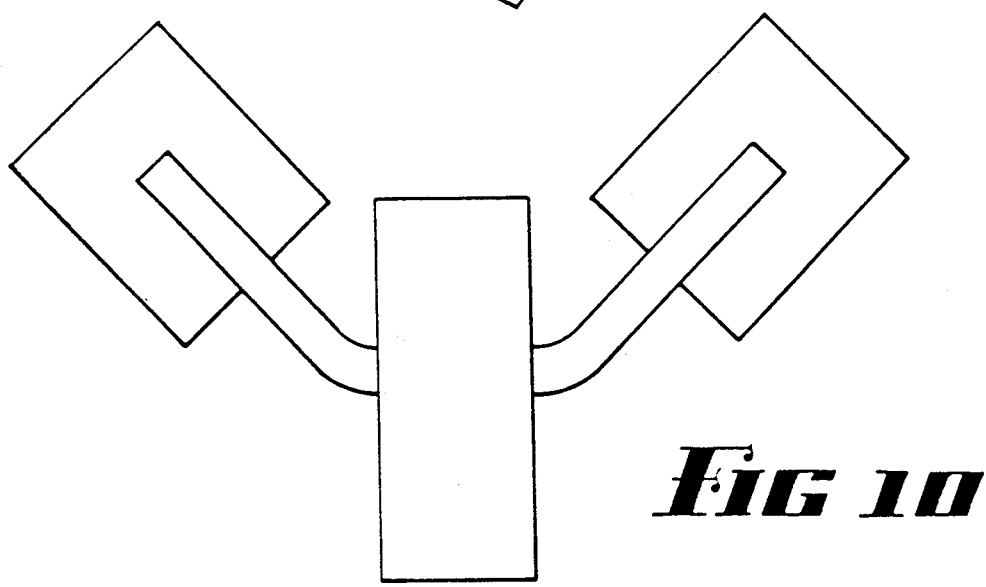
FIG. 10 is a side elevation of the same device as in FIGS. 8 and 9.

Referring now to the embodiment of FIGS. 8, 9 and 10, accordingly, the details of this embodiment are the same as those shown in FIGS. 5, 6 and 7 except there is the additional lateral piece shown at 28 and 29 which has a slot at 30 and 31 which therefore fits over the part 24 with an interference fit and accordingly provides four edges shown respectively at 32, 33, 34 and the unseen edge at 35.

Figure 11:
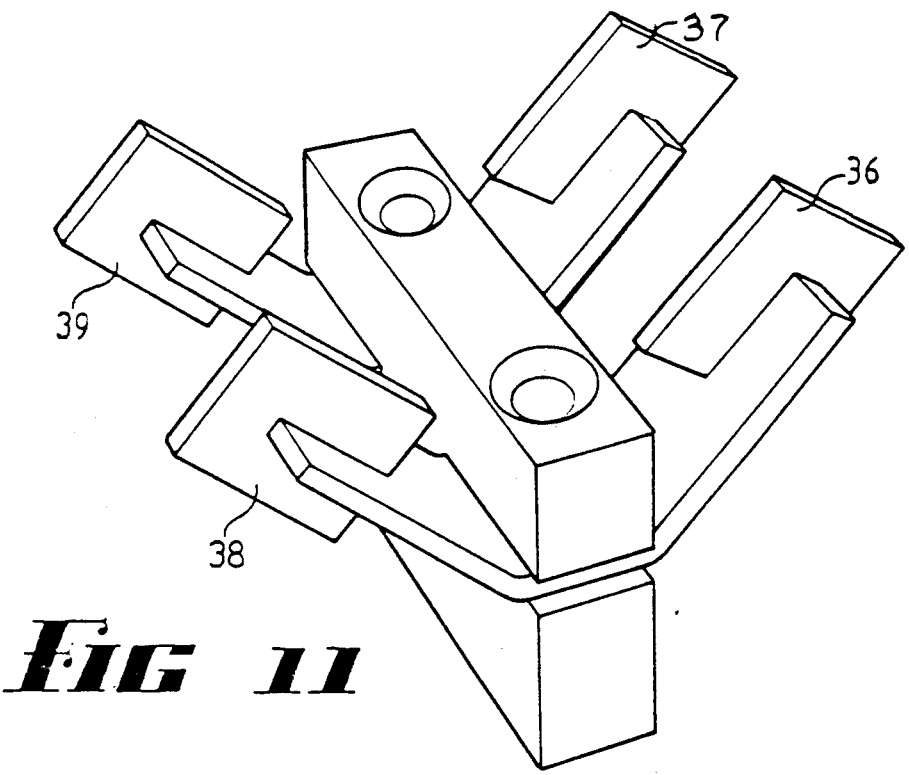
FIG. 11 is a perspective view of a fourth embodiment.
Figure 12:
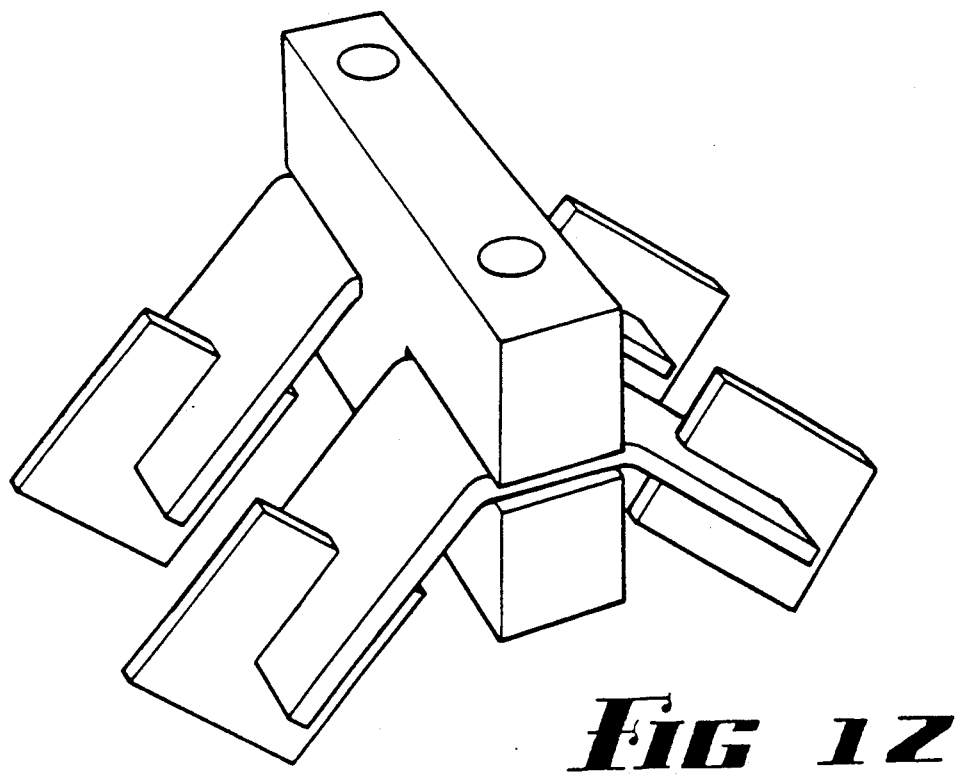
FIG. 12 is a view from below of the same fourth embodiment as shown in FIG. 11.
Figure 13:
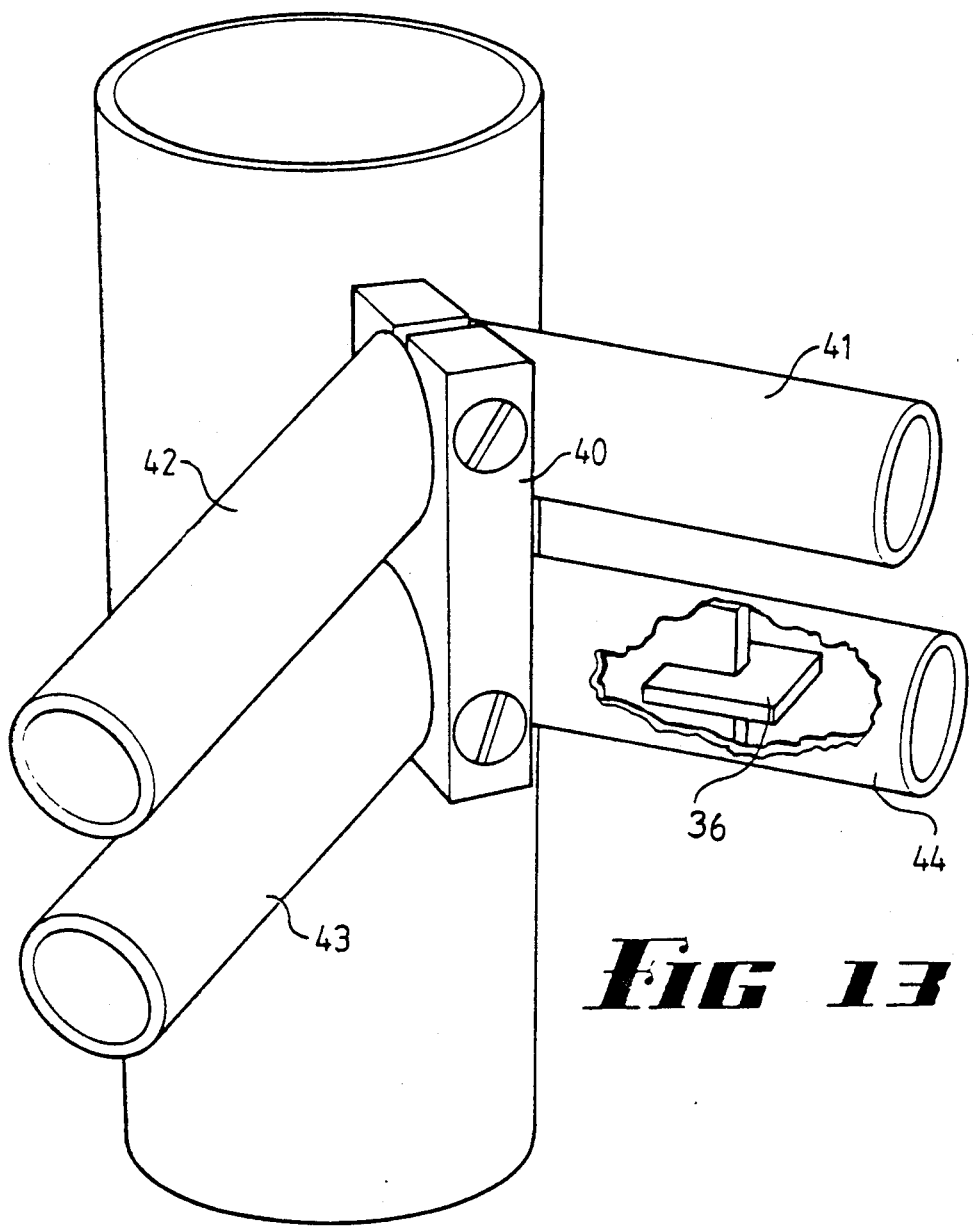
FIG. 13 is a perspective view of a construction using the embodiment as shown in FIGS. 11 and 12 with part cut away into a hollow conduit to show the detail in this.

This same feature is repeated for the further embodiment of FIG. 11 and 12 in which the lateral pieces at 36, 37, 38 and 39 are likewise fitted with an interlinked locking slot.

Figure 14:
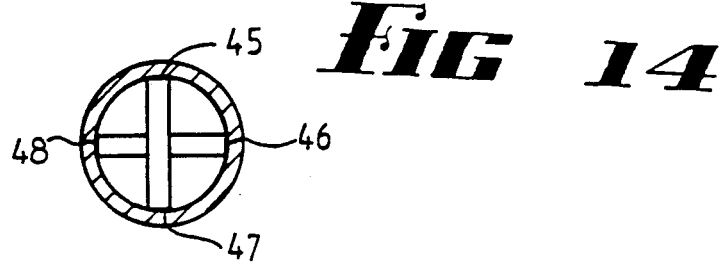
FIG. 14 is a cross-sectional view showing the lateral location of the wing parts as shown in FIG. 13.

Finally the application of these is shown most clearly in the full assembly shown in FIG. 14 in which the connector 40 provides connections for the various conduits 41, 42, 43 and 44 but of course in each of these cases, there are four intersecting faces shown most particularly in FIG. 14 at 45, 46, 47 and 48.

This provides a much stiffer interlocking and has provided a significant improvement in the arrangement.

The invention is not intended to be necessarily limited in its broader form to members made simply from metal so that these could be made from plastic material or the metal block could be secured to the frame part by alternate means.

Further, the further frame members can be made from other materials such as hollow tubes of square cross-sectional shape at least in the broader concept of this invention.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A connector for providing interconnection between frame members comprising:
    a block adapted to be attached to a side of a first frame member, said block having at least one slot formed therein and at least one aperture passing through said block and intersecting said slot,
    at least one wing member having an apex portion and two wing portions, each of said wing portions extending away from said apex portion and with an incline one wing with respect to the other to opposite ends of said wing member and adapted to engage a corresponding hollow frame member with an interference fit, said apex portion adapted to be located within said slot of said block and having an aperture formed therein in registry with an aperture in said block, and
    a fastening means passing through the apertures of said block and said apex portion to secure said block to said first frame member.

2. A connector for providing interconnection between frame members as in claim 1, wherein said connector provides securing means to positively secure said wing portions to said hollow frame members.

3. A connector for providing interconnection between frame members as in claim 1, wherein said wing portions further comprise at least one cross piece intersecting each of said wing portions so as to define at least four spaced apart edges adapted to be located within said hollow frame member.

4. A connector for providing interconnection between frame members as in claim 3, wherein said spaced apart edges of each of said wing portions collectively engage said hollow frame member with an interference fit.

5. A connector for providing interconnection between frame members as in claim 3 wherein each said cross piece is secured to each of said wing portions by mutually overlapping slots.

6. A connector for providing interconnection between frame members, said connector comprising:

an elongate, rectangular block adapted to be attached to a side of a first frame member, at least one wing member secured to the block, said wing member including two wing portions extending away from an apex portion and with an incline one wing with respect to the other to opposite ends of the wing member, each of said two wing portions adapted to fit with an interference fit within the end of a respective hollow frame member, said block having a slot formed in at least one end and having at least one aperture passing therethrough and intersecting said slot for securing said block to said first frame member, said slot receiving the apex portion of said wing member such that said wing member is affixed within said block, said apex portion having an aperture formed therein in registry with said aperture of said block, and a fastening means passing through the apertures of said block and said apex portion to secure said block to said first frame member.

7. A connector for providing interconnection between frame members as in claim 6, wherein said connector provides securing means to positively secure said wing portions to said hollow frame member.

8. A connector for providing interconnection between frame members as in claim 6, wherein said wing portions further comprise at least one cross piece intersecting each of said wing portions so as to define at least four spaced apart edges adapted to be located with said hollow frame member.

9. A connector for providing interconnection between frame members as in claim 8, wherein said spaced apart edges of each of said wing portions collectively engage said hollow frame member with an interference fit.

10. A connector for providing interconnection between frame members, as recited in claim 8 wherein each said cross piece is secured to each of said wing portions by mutually overlapping slots.

11. A connector for providing interconnection between frame members comprising:

a block adapted to be attached to a side of a first frame member, said block having at least one slot formed therein, at least one wing member having an apex portion and two wing portions, each of said wing portions extending away from said apex portion and with an incline one wing with respect to the other to opposite ends of said wing member and adapted to engage a corresponding hollow member with an interference fit, at least one said wing portions further comprising at least one cross piece intersecting said wing portion so as to define at least four spaced apart edges adapted to be located within said hollow frame member, said apex portion adapted to be located within said slot of said block, means for retaining said apex portion of said wing member within said slot of said block, and a fastening means passing through an aperture in said block to secure said block to said first frame member.

12. A connector for providing interconnection between frame members as in claim 11, wherein said connector provides securing means to positively secure said wing member to said hollow frame member.

13. A connector for providing interconnection between frame members as in claim 11, wherein said spaced apart edges of each of said wing portions collectively engage said hollow frame member with an interference fit.

14. A connector for providing interconnection between frame members as in claim 11 where each said cross piece is secured to each of said wing portions by mutually overlapping slots.

* * * * *